United States Patent [19]

White

[11] 4,158,728

[45] Jun. 19, 1979

[54] HETEROCYCLIC-COUPLED POLYMERS OF POLYPHENYLENE OXIDES

[75] Inventor: Dwain M. White, Schenectady, N.Y.

[73] Assignee: General Electric Company, Schenectady, N.Y.

[21] Appl. No.: 808,021

[22] Filed: Jun. 20, 1977

[51] Int. Cl.$^2$ .................. C08G 65/44; C08G 65/48
[52] U.S. Cl. .................................. 528/213; 528/212; 528/214; 528/215
[58] Field of Search ......... 260/47 ET, 47 CZ, 47 CP, 260/61; 528/213, 212, 214, 215

[56] References Cited

U.S. PATENT DOCUMENTS

| | | | |
|---|---|---|---|
| 3,297,639 | 1/1967 | Picklesimer et al. | 260/61 |
| 3,733,302 | 5/1973 | Klebe et al. | 260/47 ET |
| 3,753,946 | 8/1973 | Holub et al. | 260/47 CZ |
| 3,773,718 | 11/1973 | Klebe et al. | 260/47 ET |
| 3,978,028 | 8/1976 | Sundermann et al. | 260/61 |

*Primary Examiner*—Lester L. Lee
*Attorney, Agent, or Firm*—F. Wesley Turner; Joseph T. Cohen; Charles T. Watts

[57] ABSTRACT

Heterocyclic-coupled linear, branched and/or cross-linked polymers of polyphenylene oxides are described which comprise poly-functional heterocyclic radicals coupled with mono- and/or polyphenoxy radicals derived from (a) polyphenylene oxides having an average hydroxyl group per molecule value greater than zero including 1.0 or less, or (b) polyphenylene oxide-quinone coupled polymers having an average hydroxyl group per molecule value greater than zero including 2.0 or less, and mixtures thereof.

18 Claims, No Drawings

HETEROCYCLIC-COUPLED POLYMERS OF POLYPHENYLENE OXIDES

CROSS REFERENCE TO RELATED APPLICATIONS

This invention is related to subject matter disclosed in my copending U.S. application Ser. Nos. 800,635, 800,641, 800,656, and 800,644, all filed on May 26, 1977. All of the aforesaid applications are also my inventions and are assigned to the same assignee as the assignee of this application. All of the disclosures referenced above are incorporated herein in their entirety by reference.

BACKGROUND OF THE INVENTION

1. Field of the Invention

This invention relates to heterocyclic-coupled linear, branched, and/or cross-linked polymers of polyphenylene oxides which comprise polyfunctional heterocyclic radicals coupled with mono- and/or poly-phenoxy radicals derived from (a) polyphenylene oxides having an average hydroxyl group per molecule value greater than zero including 1.0 or less, and/or (b) quinone coupled polyphenylene oxide polymers having an average hydroxyl group per polymer molecule value greater than zero including 2.0 or less, and mixtures thereof.

In my copending U.S. application Ser. No. 800,635 new polyphenylene oxide-quinone coupled polymers having an average hydroxyl group per molecule value greater than zero including 2.0 or less are described. These new polymers either alone or in combination with polyphenylene oxides reaction products of the prior art, i.e., polyphenylene oxides having an average hydroxyl group per molecule value greater than zero including 1.0 or less, or combinations thereof can be coupled with heterocyclic radicals to form new linear, branched, and/or cross-linked polyphenylene oxide polymers.

2. Description of the Prior Art

Self-condensation reactions of certain phenols employing oxygen in combination with an effective oxidative coupling catalyst system to form prior art polyphenylene oxides, i.e., polyphenylene oxides having an average hydroxyl group per molecule of 1.0 or less, are described in various U.S. patent applications including Hay's U.S. Pat. Nos. 3,306,879, 3,914,266, application Ser. No. 540,473, filed Jan. 13, 1975, a continuation-in-part of Ser. No. 441,295, filed Feb. 11, 1974, now abandoned, and Olander's U.S. Pat. Nos. 3,956,442; 3,965,069; 3,972,851 and Ser. No. 582,910, filed June 2, 1975.

Block polymers of prior art polyphenylene oxides employing simple bifunctional coupling compounds such as diacyl halides, diisocyanates, bis(haloaryl)sulfones are described in my U.S. Pat. Nos. 3,793,564; 3,770,850 and 3,809,729.

DESCRIPTION OF THE INVENTION

This invention embodies new heterocyclic-coupled linear, branched, and/or cross-linked polymers of polyphenylene oxides which comprise poly-functional heterocyclic radicals coupled with mono- and/or poly-phenoxy radicals derived from (a) polyphenylene oxides having an average hydroxyl group per molecule value greater than zero including 1.0 or less, and/or (b) quinone-coupled polyphenylene oxide polymers having an average hydroxyl group per molecule value greater than zero including 2.0 or less, and mixtures thereof.

The phenoxy radicals (sometimes referred to herein as monovalent phenoxy residues, and also sometimes abbreviated by the formula -A) are derived from polyphenylene oxides having an average hydroxyl group per molecule value greater than zero including 1.0 or less. These polyphenylene oxides can be prepared by any of the methods known to those skilled in the art including those referenced hereinbefore. Monovalent phenoxy residues of a presently preferred class are illustrated by the formula:

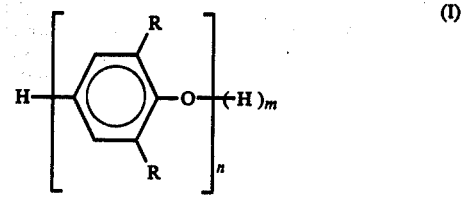

wherein independently each R is hydrogen, a hydrocarbon radical, a halohydrocarbon radical, a hydrocarbonoxy radical or a halohydrocarbonoxy radical, n is a number of at least 10, preferably 40 to 170, and m is zero. Corresponding polyphenylene oxide precursors are illustrated by formula (I) wherein R and n are as defined above, and m is a number greater than zero including 1.0 or less.

The quinone-coupled polyphenoxy radicals (sometimes referred to herein as divalent phenoxy radicals, and also sometimes abbreviated by the formula —B—) are derived from quinone-coupled polyphenylene oxide polymers having an average hydroxyl group per molecule greater than zero including 2.0 or less. These polyphenylene oxides can be prepared by any of the methods described in my previously referred to U.S. application Ser. No. 800,635. Divalent quinone-coupled polyphenoxy radicals of a presently preferred class are illustrated by the formula:

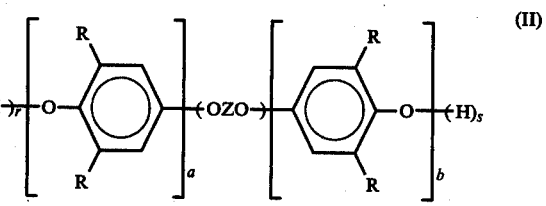

wherein independently each —OZO— is a divalent quinone residue, Z is a divalent arene radical, either a or b is at least equal to 1, the sum of a plus b is preferably at least equal to 10, more preferably 40 to 170, r and s are zero, and R is the same as defined in formula (I) above. Corresponding quinone-coupled polyphenylene oxide precursors are illustrated by formula (II) wherein —OZO—, Z, a, b, the sum of a plus b, and R is the same as defined in formula (II) above, r and s are greater than zero including 1 or less, and the sum of r plus s is greater than zero including 2.0 or less.

The "heterocyclic radicals" (sometimes referred to herein as poly-functional heterocyclic residues, and also sometimes abbreviated by the formula —Z— and $$-\overset{|}{Z}-,$$

etc.) are derived from any halo substituted nitrogen containing heterocyclic aromatic compound having at least two halogen atoms directly bonded to carbon atoms associated with an aromatic ring structure. An aromatic heterocyclic ring compound is defined herein as any heterocyclic ring structure in which carbon and nitrogen atoms are joined alternatively by one or by two pairs of shared electrons, i.e. heterocyclic compounds exhibiting a state of dynamic electron oscillation, sometimes referred to as resonance. The heterocyclic compounds can be monocyclic, polycyclic or fused polycyclic and can have two or more cyclic systems (monocyclic, polycyclic or fused polycyclic systems) which are directly joined to each other by single or double valence bonds, or by bi- or multivalent radicals. The heterocyclic rings can have any number of ring members, e.g. 3-10, or more, etc., and can have the halogen substituents located at any reactive positions on these rings, for example in six membered rings at any ortho or para position, preferably ortho, relative to any of the ring nitrogen atoms. Presently preferred heterocyclic compounds are monocyclic systems having (a) 6 ring members, (b) 1-3 nitrogen ring members, (c) 3-5 carbon ring members, and (d) 1-3 chlorine ring substituents. Illustrative of presently preferred heterocyclic radicals and heterocyclic radical precursors are set out hereafter:

| EQUIVALENTS FOR CYANURIC CHLORIDE X = Halo (Br, Cl, I) | | | | |
|---|---|---|---|---|
| Heterocyclic Radicals | | | Heterocyclic Radical Precursors | |
| | Formulas | Name | Formulas | Name |
| (IIIa) | | 2,6-pyridinediyl | | 2,6-Dihalopyridine |
| (IIIb) | | 2,4,6-pyridinethiyl | | 2,4,6-Trihalopyridine |
| (IIIc) | | 3,6-pyridazinediyl | | 3,6-Dihalopyridazine |
| (IIId) | | 2,4-pyrimidinediyl | | 2,4-Dihalopyrimidine |
| (IIIe) | | 4,6-pyrimidinediyl | | 4,6-Dihalopyrimidine |
| (IIIf) | | 2,4,6-pyrimidinetriyl | | 2,4,6-Trihalopyrimidine |
| (IIIg) | | 2,6-pyrazine | | 2,6-Dihalopyrazine |
| (IIIh) | | 2,5-pyrazine | | 2,5-Dihalopyrazine |
| (IIIi) | | 2,3,6-pyrazine | | 2,3,6-Trihalopyrazine |
| (IIIj) | | 2,3,5,6-pyrazine | | 2,3,5,6-Tetrahalopyrazine |
| (IIIk) | | 2,4-triazine | | 2,4-Dihalotriazine |

-continued
EQUIVALENTS FOR CYANURIC CHLORIDE
X = Halo (Br, Cl, I)

| Heterocyclic Radicals | | Heterocyclic Radical Precursors | |
|---|---|---|---|
| Formulas | Name | Formulas | Name |
| (IIIl) | Cyanuric halide | | Cyanuric halide |
| (IIIm) | Isoquinoline | | Dihaloisoquinoline |
| (IIIn) | 2,6-Dihalo-7-methyl purinediyl | | 2,6(7-methyl) purine |
| (IIIo) | 1,4-Dihalophthalazinediyl | | 1,4-phthalazine |

Illustrative of the broad group of heterocyclic-coupled polymers of polyphenylene oxides that are included in the scope of this invention, among others, are those described by the following illustrative linear, branched and cross-linked polymer structures:

| | |
|---|---|
| (IV linear) | AZA, AZB, BZB, AZBZA, AZBZB, BZBZB, etc. |
| | B   BA   AA |
| (IV branched) | AZA, AZBZA, AZBZA, etc. |
| |         A |
| | A       Z |
| (IV cross-linked) | AZBZBZA, AZBZBZ, etc. |
| | B  B    B   A |
| | AZBZBZBZA  AZBZBZA |
| |                A A |

The above illustrative linear, branched, cross-linked combinations of monovalent phenoxy radicals, divalent phenoxy radicals, and di-, tri- and/or tetra- functional heterocyclic radicals are not intended to limit the combinations that can be obtained by the practice of this invention since such combinations are limited only by the stoichiometric amounts of the representative precursors of the various radicals charged to the reaction medium during the preparation of the compositions of this invention. Preferred heterocyclic-coupled polyphenylene oxides are linear polymers wherein the heterocyclic radicals of the polymer backbone are primarily difunctional heterocyclic residues.

In general, preparation of heterocyclic-coupled polyphenylene oxides can be carried out by contacting a polyphenylene oxide in solution in an inert solvent with a halo-substituted heterocyclic aromatic compound, preferably in the presence of an aqueous solution of a water soluble base and a catalytic phase transfer agent. Any amount of heterocyclic-coupling agent can be employed, however, for obvious reasons, economic primarily, the amount is preferably the stoichiometric amount required to react with all of the hydroxyl groups associated with the reaction products of the polyphenylene oxides. Accordingly, the quantities of heterocyclic-coupling agent employed can vary from 1/1000 to 1000 times the stoichiometric requirements required to completely couple all of the hydroxyl groups associated with the polymer.

Any amount of water soluble base can be employed, however generally effective mole proportions relative to the amount of heterocyclic-coupling agent that can be employed effectively are heterocyclic-coupling agent:water soluble base proportions of from about 1:100 to about 50:1 and more frequently from about 1:10 to about 10:1.

Any amount of catalytic phase transfer agent can be employed relative to the amount of water soluble base. Generally effective molar proportions of catalytic phase transfer agent to water soluble base are within the range of from about 1:10 to about 1:1000 and more frequently within the range of from 1:20 to 1:200.

The heterocyclic-coupling can be carried out at any reaction temperature but preferably is carried out at temperatures within the range of from 0° to 150° C. or even higher, more preferably from 50° C. to 100°.

As stated above in a preferred embodiment, the reaction is carried out in the presence of water soluble base as well as in the presence of a catalytic phase transfer agent. The water soluble base can be any water soluble base which, in the presence of the phenoxy mono- or polyvalent or divalent phenoxy radicals will convert substantially all of the hydroxy groups associated therewith to phenoxides, i.e. alkali metal or alkaline earth metal cation phenoxides or "onium" phenoxides derived from the phase transfer catalyst. Further illustration of the bases that can be employed are alkali metal or alkaline earth metal hydroxides and carbonates, e.g. potassium hydroxide, sodium hydroxide, sodium monocarbonate, barium carbonate, etc.

The amount of water soluble base employed relative to the hydroxyl content of the polymers can be any amount, e.g. an amount of from about 0.1 to about 1000, preferably from about 1 to about 20, and more preferably from 1.5 to about 5 moles of base per hydroxyl group associated with the polymers as identified by hydroxyl group infrared absorption at 3610 cm.$^{-1}$ based on a 2.5% solution in a $CS_2$ over a 1 cm. path calibrated against $CS_2$ in a matched cell.

Any catalytic phase transfer agent can be employed, e.g. quaternary ammonium, quaternary phosphonium or tertiary sulfonium compounds, etc. or mixtures thereof. These phase transfer agents are well-known to those skilled in the art. The catalytic phase transfer agents relative to the hydroxyl content of the polymers can also be employed in any amount, e.g. in amounts of from about 0.001 to about 10, preferably from about 0.01 to about 1.0, and more preferably from about 0.05 to about 0.5 mols, based on the molar amounts of hydroxyl groups associated with the polymer.

As illustrated by the foregoing examples, quinone-coupled polyphenylene oxides can be further coupled with heterocyclic coupling agents to form high molecular weight polyphenylene oxides. Analogous results can be obtained wherein any of the heterocyclic compounds, i.e. chemical equivalents, set out in the specification hereinbefore are substituted for cyanuric chloride or wherein any of the phase transfer agents described hereinbefore are substituted for Aliquat ® 336 employed in the examples.

The heterocyclic-coupled polyphenylene oxides can have any intrinsic viscosity and any number average molecular weight $\bar{M}_n$. Presently preferred polymers generally have an $\bar{M}_n$ value of 5,000 to 60,000, more preferably 15,000 to 30,000, having generally corresponding intrinsic viscosities of 0.17 to 1.7, and 0.4 to 0.7, respectively.

The heterocyclic-coupled polymers can be employed in conjunction with other polymers, such as high impact polystyrene, etc., and can be prepared as polymer blends as taught by Cizek in U.S. Pat. No. 3,383,435 in the preparation of polyphenylene oxide resin combinations well-known to those skilled in the art as Noryl ® resins, described in further detail in "Encyclopedia of Polymer Sience and Technology," entitled *Phenols, Oxidative Polymerization*, Vol. 10, published by Interscience Publishers (1969).

The polymers of this invention can be combined with other fillers, modifying agents, etc., such as dies, pigments, stabilizers, flame retardant additives with beneficial results.

EXAMPLE I

(A) Polymer Preparation

A 2.5 gallon stainless steel reactor equipped with an air-driven paddle stirrer, oxygen inlet tube, and water-cooled coil and jacket was charged with 6.615 l. toluene, 4,725 g. cupric chloride, 7.23 g. sodium bromide, 34.65 ml. N,N-dimethyl-butylamine (DMBA), and 41.25 ml. di(n-butyl)amine (DBA). Oxygen was bubbled through the reaction medium at a rate of 8 SCFH with vigorous mixing. 1500 g. 2,6-xylenol, also known as 2,6-dimethylphenol, in 1500 ml. of toluene was pumped into the reactor over a 41 minute period. The reaction temperature was maintained at 25° C. throughout the monomer addition and the ensuing polymerization. Summarily, the reaction parameters relative to molar ratios of 2,6-xylenol:Cu:DMBA:DBA:Br were as follows: 350:1:7:7:2.

(B) Catalyst Deactivation, and (C) Quinone Coupling

After a total reaction time of 112 minutes, the oxygen was purged by nitrogen which was bubbled through the reaction mixture. The reaction mixture was maintained under a nitrogen purge for two hours during which time it was transferred to the coupling reactor by pumping through interconnecting stainless steel tubing and heated to a temperature of about 50° C.

(D) Coupling With Cyanuric Chloride 30 ml. of a 10% Aliquat ® 336 in toluene and 81.7 g. of an aqueous 50% sodium hydroxide solution was added to the resulting reaction mixture obtained as described in (C) above contained in 2.5 gallon stainless steel reactor equipped with a nitrogen inlet tube, thermocouples and a "Polytron" homogenizer mixing head. After stirring for 12 minutes under nitrogen at 1200 r.p.m., 25.3 g. crystalline cyanuric chloride was added as a slurry in 200 ml. toluene over a 20 minute period while stirring was continued. After a total reaction time of one hour, the reaction mixture was diluted with an equal volume of toluene and the polymer was precipitated from the stirred solution by the addition of two volumes of methanol. The polymer was washed with methanol and then dried at 80° C. in a circulating air oven.

The intrinsic viscosity of the quinone coupled polymer was 0.24 dl./g. (measured in chloroform at 25°) and 0.52 dl./g. after cyanuric chloride coupling. The phenolic hydroxyl absorbance at 3610 cm.$^{-1}$ based on a 2.5% solution in $CS_2$ over a 1 cm. path calibrated against $CS_2$ in a matched cell decreased from a value of 0.390 to 0.021 as a result of the cyanuric chloride coupling.

EXAMPLE II

Under a nitrogen atmosphere, a reaction mixture containing 8.25 g. of a poly-2,6-dimethylphenylene oxide powder—which had been isolated from the oxidative coupling polymerization of 2,6-xylenol with a manganese (II) benzoin oxime catalyst and having an intrinsic viscosity of 0.24 dl./g.—Aliquat ® 336 (0.41 ml. of a 10% solution for chlorobenzene), and 25 ml. chlorobenzene was contacted with 0.484 g. of a 50% aqueous sodium hydroxide solution. The mixture was stirred with a Vibromixer stirrer for 10 minutes. Solid cyanuric chloride (0.148 g.) was added over a 15 minute period and the mixture was stirred one hour more. The reaction mixture was diluted with 25 ml. chlorobenzene. Methanol was added to precipitate the heterocyclic-coupled polymer. After washing and drying at 80° C. the polymer weighed 8.0 g. The changes in viscosity and hydroxyl absorbance are listed in Table I below:

TABLE I

| Sample | [η] | OH Absorbance at 3610 cm.$^{-1}$ |
|---|---|---|
| Initial polymer | 0.24 dl./g. | 0.253 |
| Coupled polymer | 0.60 | 0.016 |

The reaction was repeated using 0.074 g. cyanuric chloride instead of 0.148 g. The product had an intrinsic viscosity of 0.56 dl./g. and an OH absorbance at 3610 cm.$^{-1}$ of 0.032.

I claim:

1. A heterocyclic-coupled block polymer of polyphenylene oxide comprising a carbon and nitrogen ring containing aromatic heterocyclic radical, a monovalent phenoxy radical and/or a divalent quinone-coupled phenoxy radical.

2. A heterocyclic-coupled block polymer of polyphenylene oxide comprising a heterocyclic carbon and nitrogen containing heterocyclic aromatic radical in which at least two of the aromatic heterocyclic ring carbon atoms are singly and directly bonded to oxygen atoms of monovalent phenoxy or divalent quinone-coupled phenoxy radicals, wherein the monovalent phenoxy radical is of the formula

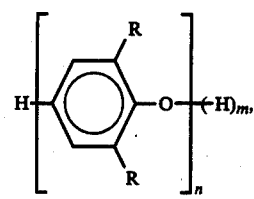

the divalent quinone-coupled phenoxy radical is of the formula:

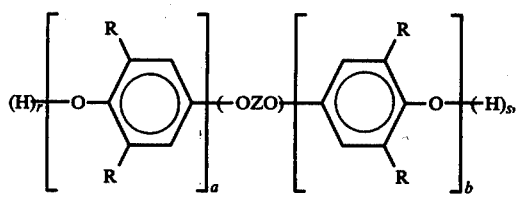

including mixtures thereof, wherein independently each R is hydrogen, a hydrocarbon radical, a halohydrocarbon radical, a hydrocarbonoxy radical, or a halohydrocarbonoxy radical, n is a number of at least 10, m, r and s are zero, either a or b is at least equal to 1, the sum of a plus b is at least equal to 1, —OZO— is a divalent quinone residue, Z is a divalent arene radical.

3. A claim 2 compound, wherein —OZO— is of the formula

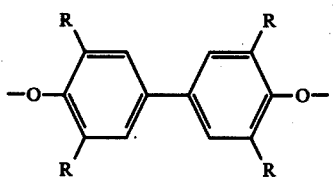

wherein independently each R is as defined hereinbefore.

4. A claim 2 compound, wherein n is at least 10, and the sum of a plus b is at least 10.

5. A claim 2 compound, wherein each R is hydrogen, a hydrocarbon, or a halohydrocarbon radical, n is a number of from 40 to 170 and the sum of a plus b is 40 to 170.

6. A claim 5 compound, wherein each R is a methyl radical.

7. A claim 6 compound, wherein the aromatic heterocyclic radical is monocyclic and contains six ring members, 1-3 nitrogen ring members, and 3-5 carbon ring members.

8. A claim 7 compound, wherein the aromatic heterocyclic radical contains two nitrogen ring members.

9. A claim 6 compound, wherein the aromatic heterocyclic radical is 2,4,6-triazinetriyl.

10. A process of forming a heterocyclic-coupled block polymer of a polyphenylene oxide which comprises contacting a carbon and nitrogen ring containing aromatic heterocyclic halide having at least two halogen atoms directly bonded to heterocyclic ring carbon atoms with (I) a polyphenylene oxide having an average hydroxyl group per molecule value greater than zero including 1.0 or less, and/or (II) a quinone-coupled polyphenylene oxide having an average hydroxyl group per molecular value greater than zero including 2.0 or less.

11. The claim 10 process, wherein the polyphenylene oxide is of the formulae:

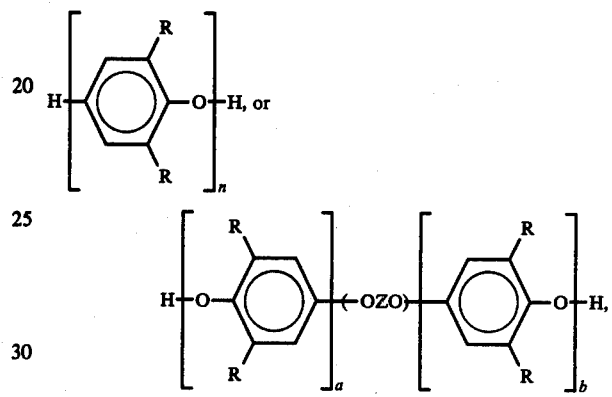

wherein independently each R is hydrogen, a hydrocarbon radical, a halohydrocarbon radical, a hydrocarbonoxy radical or a halohydrocarbonoxy radical, n is a number of at least 10, either a or b is at least equal to 1, the sum of a plus b is at least equal to 1, —OZO— is a divalent quinone residue, and Z is a divalent arene radical.

12. The claim 11 process, wherein —OZO— is of the formula

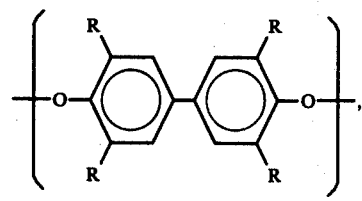

wherein independently each R is as defined hereinbefore.

13. The claim 12 process, wherein n is at least 10, and the sum of a plus b is at least 10.

14. The claim 13 process, wherein each R is hydrogen, a hydrocarbon, or a halohydrocarbon radical, n is a number of from 40 to 170 and the sum of a plus b is 40 to 170.

15. The claim 14 process, wherein each R is a methyl radical and the heterocyclic halide is cyanuric chloride.

16. The claim 10 process, carried out in the substantial absence of a hydrolyzing agent.

17. The claim 16 process, carried out in the presence of water soluble base.

18. The claim 17 process, carried out in the presence of a catalytic phase transfer agent.

* * * * *